United States Patent [19]

Hattori et al.

[11] Patent Number: 5,206,301
[45] Date of Patent: Apr. 27, 1993

[54] HYDROGENATED BLOCK COPOLYMER AND COMPOSITION COMPRISING THE SAME

[75] Inventors: Iwakazu Hattori; Noboru Oshima; Tooru Shibata; Yasuo Takeuchi, all of Tokyo, Japan

[73] Assignee: Japan Synthetic Rubber Co., Ltd., Tokyo, Japan

[21] Appl. No.: 536,564

[22] PCT Filed: Nov. 14, 1989

[86] PCT No.: PCT/JP89/01157

§ 371 Date: Jul. 12, 1990

§ 102(e) Date: Jul. 12, 1990

[87] PCT Pub. No.: WO90/05753

PCT Pub. Date: May 31, 1990

[30] Foreign Application Priority Data

Nov. 14, 1988 [JP] Japan .................. 63-285774

[51] Int. Cl.$^5$ .................. C08F 297/04; C08L 53/02
[52] U.S. Cl. .................. 525/314; 525/88; 525/92; 525/93; 525/94; 525/95; 525/96; 525/98; 525/285; 525/904; 525/914
[58] Field of Search .................. 525/98, 94, 285, 314, 525/904, 914, 88, 92, 93, 95, 96

[56] References Cited

U.S. PATENT DOCUMENTS

| | | | |
|---|---|---|---|
| 3,251,905 | 5/1966 | Zelinski | 525/272 |
| 3,281,383 | 10/1966 | Zelinski et al. | 525/106 |
| 3,639,517 | 2/1972 | Kitchen et al. | 525/123 |
| 3,670,054 | 6/1972 | De La Mare et al. | 260/880 B |
| 4,077,893 | 3/1978 | Kiovsky | 525/193 |
| 4,163,765 | 8/1979 | Moczygemba | 525/314 |
| 4,628,072 | 12/1986 | Shiraki et al. | 525/95 |
| 4,814,386 | 3/1989 | Hellermann et al. | 525/314 |
| 4,939,208 | 7/1990 | Langa et al. | 525/314 |

FOREIGN PATENT DOCUMENTS

| | | | |
|---|---|---|---|
| 1155248 | 10/1983 | Canada | 525/314 |
| 262232 | 4/1988 | European Pat. Off. . | |
| 262691 | 4/1988 | European Pat. Off. . | |
| 2158575 | 5/1973 | Fed. Rep. of Germany | 525/314 |
| 58-27740 | 2/1983 | Japan . | |
| 63-3054 | 1/1988 | Japan . | |
| 63-179955 | 7/1988 | Japan . | |
| 63-179956 | 7/1988 | Japan . | |
| 2090840 | 7/1982 | United Kingdom | 525/314 |
| 2163757 | 3/1986 | United Kingdom | 525/314 |

Primary Examiner—James J. Seidleck
Assistant Examiner—Vasu S. Jagannathan
Attorney, Agent, or Firm—Oblon, Spivak, McClelland, Maier & Neustadt

[57] ABSTRACT

A hydrogenated block copolymer having a number-average molecular weight of 40,000–700,000, obtained by hydrogenating at least 80% of the olefinic bonds of a block copolymer having in the molecule at least one each of a polymer block A composed of 90% by weight or more of a vinyl aromatic compound, a polybutadiene polymer block B having a 1,2-vinyl structure of 30–70%, and a polybutadiene polymer block C having a 1,2-vinyl structure of less than 30%, in which block copolymer the blocks A, B and C are contained at a specific ratio, or a unit of the block copolymer is bonded, via a coupling agent residue, to at least one polymer block unit of the blocks A, B and C and thereby the polymer molecular chain is extended or branched; and a thermoplastic resin composition comprising the hydrogenated block copolymer.

6 Claims, 2 Drawing Sheets

HYDROGENATED BLOCK COPOLYMER AND COMPOSITION COMPRISING THE SAME

DESCRIPTION

1. Technical Field

The present invention relates to a special thermoplastic block copolymer having excellent weather resistance, impact resistance and coatability and suited for rubber applications and improvement of resins in impact resistance and coatability, as well as to a composition comprising said copolymer.

2. Background Art

Thermoplastic elastomers are used as an impact resistance improver for polypropylene and polystyrene. As the thermoplastic elastomer suited for this application, there have hitherto been known block copolymers composed of a polystyrene (A) and a polybutadiene (B) and represented by the general formula A—B—A, B—A—B—A or (A—B)$_n$X (X is a coupling agent residue). In order to improve the weather resistance and heat resistance of these thermoplastic elastomers, there are known a hydrogenated polybutadiene obtained by hydrogenating a block copolymer comprising a polybutadiene having a 1,2-structure adjusted to 30-50% and a polystyrene. However, when said hydrogenated polybutadiene is used as an improver for plastics such as polypropylene resin, polystyrene and the like, low temperature impact resistance of the resultant composition is low because the glass transition temperature of its elastomer block portion becomes high. It is also known that a hydrogenated block copolymer obtained by hydrogenating a block copolymer comprising a polybutadiene block high 1,4 structure and a polybutadiene polymer block high 1,2 structure, also shows dynamic properties of thermoplastic elastomer. However, when used as an improver for α-olefin resins, coatability is poor.

DISCLOSURE OF THE INVENTION

Impact resistance improvers for polypropylene, polystyrene, etc. are required to have low temperature impact resistance, weather resistance and coatability. The impact resistance improvers of thermoplastic elastomer type conventionally used, however, do not fully satisfy the above requirements; therefore, the development of a new impact resistance improver has been desired. The object of the present invention is to provide a novel thermoplastic elastomer satisfying the above requirements.

The present inventors made extensive research to solve the above-mentioned problems of the prior art. As a result, it was found that the above object can be attained by a hydrogenated block copolymer obtained by hydrogenating a block copolymer comprising a polymer block A composed mainly of a vinyl aromatic compound, a polybutadiene polymer block B medium in 1,2-vinyl structure and a polybutadiene polymer block C low 1,2-vinyl structure. The present invention has been completed based on the above finding.

BEST MODE FOR CARRYING OUT THE INVENTION

Figure 1:
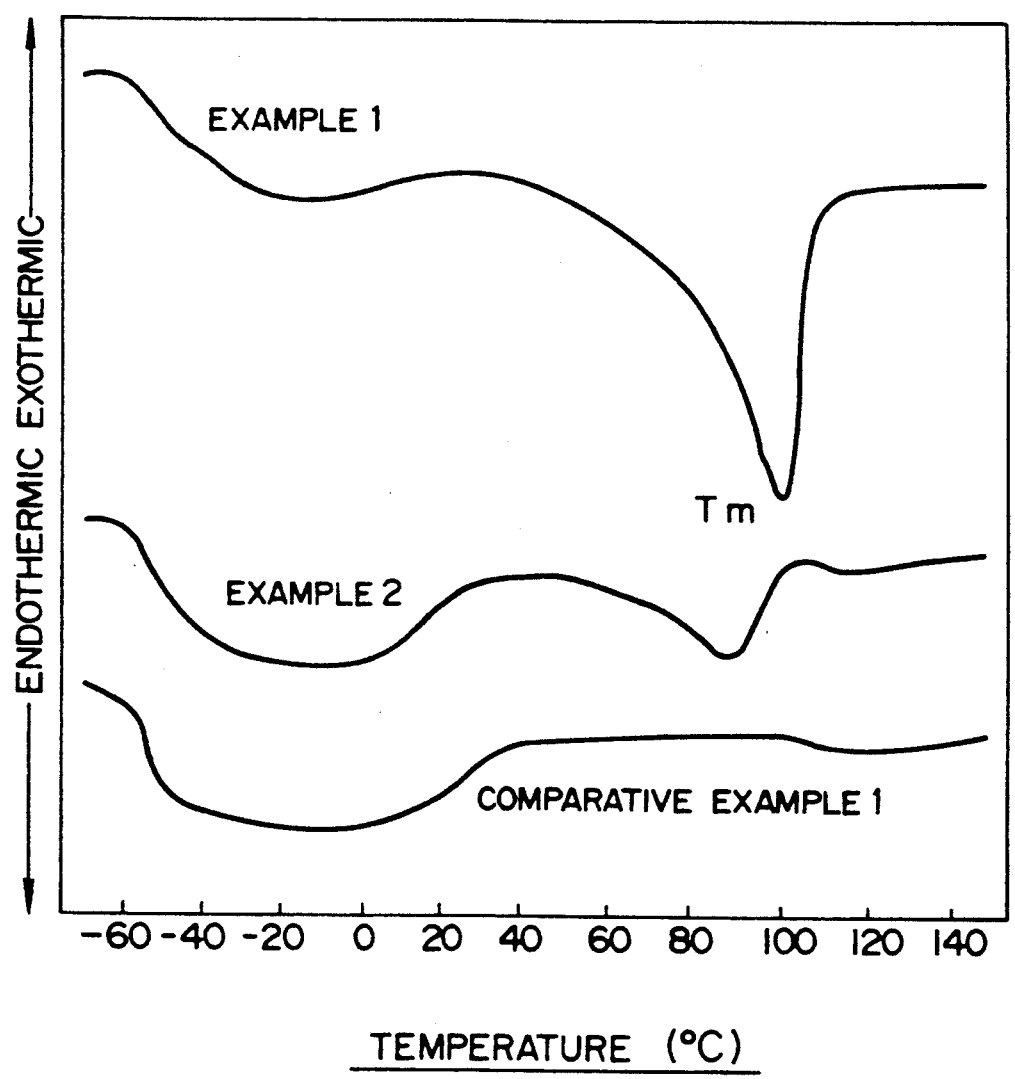
FIG. 1 shows the DSC curves of the hydrogenated block copolymers obtained in Examples 1 and 2 and Comparative Example 1.

The present invention provides a hydrogenated block copolymer having a number-average molecular weight of 40,000-700,000, obtained by hydrogenating at least 80% of the olefinic bonds of an unhydrogenated block copolymer having in the molecule at least one each of a polymer block A composed of 90% by weight or more of a vinyl aromatic compound, a polybutadiene polymer block B having a 1,2-vinyl structure of 30-70%, and a polybutadiene polymer block C having a 1,2-vinyl structure of less than 30%, in which unhydrogenated block copolymer the content of the polymer block A is 10-50% by weight, the content of the polymer block B is 30-80% by weight, and the content of the polymer block C is 5-30% by weight, or a unit of said block copolymer is bonded, via a coupling agent residue, to a polymer unit consisting of at least one polymer block of the A, B and C and thereby the polymer molecular chain is extended or branched.

The hydrogenated block copolymer comprises, as essential components, at least one each of the polymer blocks A, B and C. The block copolymer having the simplest structure includes a block copolymer having a structure of (A—B—C). The block copolymer may be, besides the above basic arrangement, a block copolymer in which at least each one of all or part of the three polymer blocks is arranged regularly or irregularly.

The unhydrogenated block copolymer may also be a block copolymer in which the above block copolymer unit is bonded to other 1-3 polymer blocks via a coupling agent residue and thereby the polymer molecular chain is extended or branched. The other polymer blocks to be bonded consist of at least one of the polymer blocks A, B and C. In particular, a block copolymer in which the block copolymers each consisting of A, B and C are bonded to each other via a coupling agent residue, for example, a block copolymer having a structure of (A—B—C)$_n$X (n is an integer of 2-4, and X is a coupling agent residue) can be easily obtained, as described later, by block copolymerization and subsequent addition of a coupling agent such as diethyl adipate, divinylbenzene, silicon tetrachloride, tin tetrachloride, dimethyldichlorosilicon, 1,2-dibromoethane, 1,4-chloromethylbenzene or the like. In this case, also, when one polymer block comprises A, B and C, other polymer block(s) need not comprise all of the three components, and a structure of, for example, (A—B—C)X(A—B) is allowed.

The polymer block A constituting the block copolymer of the present invention is a polymer of at least one aromatic vinyl compound selected from aromatic vinyl compounds such as styrene, α-methylstyrene, vinyltoluene, p-tert-butylstyrene and the like, or a copolymer of an aromatic vinyl compound and 1,3-butadiene. In the polymer block A, the content of the aromatic vinyl compound is 90% by weight or more and at least 80% of the olefinic unsaturated bonds is hydrogenated. When the aromatic vinyl compound content in the polymer block A is less than 90% by weight, a blend of the resulting hydrogenated block copolymer with an α-olefin resin has low coatability, which is not preferable. The content of the polymer block A in the unhydrogenated block copolymer is 10-50, preferably 15–45% by weight, and the number-average molecular weight of the polymer block A is 5,000–70,000. When the content is 10% by weight or less, improvement in coatability is insufficient; when the content is more than 50% by weight, improvement in low temperature impact resistance is low.

The content of the polymer block B constituting the block copolymer of the present invention is 30–80, preferably 35–70% by weight. The polymer block B is a polybutadiene having a 1,2-vinyl structure of 30–70%, preferably 40–60% and a number-average molecular weight of 30,000–300,000. In the polymer block B, at least 80% of the olefinic structure bonds is hydrogenated.

The polymer block B, when hydrogenated by 100%, becomes a polymer similar to a random copolymer of ethylene and butene-1.

When the 1,2-vinyl structure in the unhydrogenated polybutadiene which becomes the polymer block B is less than 30%, polyethylene chain is formed in the polymer block B by hydrogenation, whereby the rubbery property is lost. When the content is more than 70%, the glass transition temperature gets higher by hydrogenation and the rubbery property is lost, which is not preferable. When the content of the polymer block B in the unhydrogenated block copolymer is less than 30% by weight, a blend of the resulting hydrogenated block copolymer with a resin shows no improvement in low temperature impact resistance; when the content is more than 80% by weight, pelletization is impossible and processability is low.

The content of the polymer block C constituting the block copolymer of the present invention is 5–30, preferably 5–25% by weight. The polymer block C is a polybutadiene having a 1,2-vinyl structure of less than 30%, preferably 3–20% and a number-average molecular weight of 10,000–300,000. In the polymer block C, at least 80% of the olefinic bonds is hydrogenated.

When the 1,2-vinyl structure of the unhydrogenated polybutadiene in the polymer block C is more than 30%, the resinous property is lost even after hydrogenation, and the block copolymer comprising such a block has no property of thermoplastic elastomer. It is difficult to produce a polybutadiene having a 1,2-vinyl structure of less than 3%. When the content of the polymer block C in the unhydrogenated block copolymer is less than 5% by weight, a blend of the resulting hydrogenated block copolymer with a resin shows insufficient improvement in low temperature impact resistance; when the content is more than 30% by weight, improvement in low temperature impact resistance is poor, which is not preferable.

The hydrogenated block copolymer of the present invention has a number-average molecular weight of 40,000–700,000.

In the hydrogenated block copolymer of the present invention, it is necessary that at least 80%, preferably at least 90% of the olefinic bonds is hydrogenated. When the hydrogenation degree is less than 80%, the weather resistance and heat resistance are insufficient.

When the hydrogenated block copolymer of the present invention is viewed from the morphology, the block A and the block C are each a resin phase, and the block B is a rubber phase. Since these blocks have a phase-separation (three layers) structure, the block copolymer of the present invention, unlike the conventional block copolymers represented by A—B—A or C—B—C and having a phase-separation (two layers) structure, shows excellent coatability, low temperature impact resistance, weather resistance and gloss when blended with a resin.

The block copolymer of the present invention is used in rubber applications such as electric wire, roofing, footwear, industrial articles and the like, alone or in blends with ethylene-propylene rubber, ethylene-propylene-diene rubber, butyl rubber, halogenated butyl rubber, etc.

The block copolymer of the present invention is added to resins such as crystalline α-olefin [e.g. polyethylene, polypropylene, ethylene-butene-1 copolymer, ethylene-hexene-1 copolymer, ethylene-octene-1 copolymer, propylene-ethylene copolymer, poly(butene-1) poly(3-methylbutene-1), poly(4-methylpentene-1)], polystyrene and the like, as an impact resistance improver for said resins in an amount of 5–50 parts by weight, preferably 10–45 parts by weight per 100 parts by weight of the resin, and the resulting improved resins can be used in exterior parts for automobiles, household electric appliances, parts for vehicles, films, etc.

The hydrogenated block copolymer of the present invention can also be made into a modified hydrogenated block copolymer by modifying the former with an anhydride of an α,β-unsaturated carboxylic acid such as maleic anhydride, itaconic anhydride, maleic anhydride or the like, or with an epoxy group-containing unsaturated compound such as glycidyl (meth)acrylate, allyl glycidyl ether, vinyl glycidyl ether or the like. Such a modified hydrogenated block copolymer has affinity also with such resins as polyamide, polyester, poly(henylene oxide), polyacetal, polycarbonate, polymethacrylate, poly(phenylene sulfide), acrylonitrilestyrene copolymer and the like. Therefore, it is added to the resins as an impact resistance improver for the resins in an amount of 5–40 parts by weight, preferably 10–30 parts by weight per 100 parts by weight of the resin, and the improved resins can be used in exterior parts for automobiles, household electric appliances, parts for vehicles, films, etc.

In some cases, the hydrogenated block copolymer can be mixed with poly(phenylene oxide), etc. without being modified.

The block copolymer of the present invention can be obtained by polymerizing 1,3-butadiene in the presence of an organolithium initiator in a hydrocarbon solvent, then adding a polar compound so that the 1,2-vinyl structure becomes a desired range of 30–70%, effecting the polymerization of 1,3-butadiene to form a polybutadiene of block form having a different content of 1,2-vinyl structure, finally adding an aromatic vinyl compound or an aromatic vinyl compound and 1,3-butadiene and effecting polymerization to obtain an unhydrogenated block copolymer, and hydrogenating the copolymer by an ordinary method.

Besides, there can also be mentioned a process comprising first polymerizing an aromatic vinyl compound or an aromatic vinyl compound and 1,3-butadiene in the presence of an organolithium initiator in a hydrocarbon solvent to form a polymer block composed mainly of an aromatic vinyl compound, then adding 1,3-butadiene and a polar compound, and effecting temperature elevation polymerization to obtain an unhydrogenated block copolymer.

At the terminals of these active block copolymers can be introduced functional groups such as OH group, COOH group, —NR$_n$group, —NHR group, NCO group, —CSSH group, —Si(OR)$_n$ group (R is alkyl or aryl, and n is an integer of 1-3) and the like, by terminating said terminals with a compound such as ethylene oxide, benzophenone, carbon dioxide gas, dialkylaminobenzaldehyde, 4,4'-dialkylaminobenzophenone, N-methyloxazolidinone, tolylene diisocyanate, diphenylmethane diisocyanate, carbon disulfide, tetraalkoxysilane, alkyltriphenoxysilane or the like.

By adding a coupling agent such as diethyl adipate, divinylbenzene, silicon tetrachloride, tin tetrachloride, dimethyldichlorosilicon, 1,2-dibromoethane, 1,4-chloromethylbenzene or the like to said active block copolymers, there can be obtained a block copolymer having an extended or branched molecular chain. By hydrogenating this block copolymer, there can also be obtained a hydrogenated block copolymer of the present invention.

As the hydrocarbon solvent used in the polymerization, there can be mentioned pentane, hexane, heptane, octane, cyclohexane, methylcyclopentane, cyclopentane, 2-methylbutene-1, 2-methylbutene-2, etc. These can be used alone or, as necessary, in admixture of two or more.

As the organic alkali or alkaline earth metal initiator, there can be used n-butyllithium, sec-butyllithium, tert-butyllithium, propyllithium, amyllithium, butyllithium, barium nonylphenoxide, trialkylaluminums, alkali metal salts of dialkylaminoethanols, alkali metal salts of alkylene glycols, etc.

The hydrogenation of the block copolymer is effected at a hydrogen pressure of 1-100 kg/cm$^2$ at a reaction temperature of 0°-150° C. using a catalyst wherein a metal such as Ni, Pd, Pt, Rh, Ru, Re or the like is supported by silica, alumina, carbon or the like, or a catalyst which is a combination of a transition metal compound (e.g. zero- to bivalent complex compound having a phosphorus compound as a ligand, titanocene dichloride, titanocene diphenyl, titanocene ditolyl, titanocene dibenzyl, titanium tetrachloride, zirconocene dichloride, trisacetylacetonatoiron, trisacetylacetonatocobalt, cobalt octanoate, cobalt naphthenate, bisacetylacetonatonickel, nickel octanoate, nickel naphthenate) and an organometal compound of a metal of 1-3 groups of the periodic table (e.g. organolithium, polymer lithium, dialkylmagnesium, Grignard reagent, dialkylzinc, trialkylaluminum, dialkylaluminum chloride, dialkylaluminum hydride).

The catalyst residue is removed from the hydrogenated block copolymer solution; a phenol type or amine type anti-oxidant is added; then, a hydrogenated block copolymer can be easily isolated from the resulting polymer solution. Specifically, the isolation of polymer can be effected by, for example, a method wherein acetone, an alcohol or the like is added to the polymer solution to cause precipitation, or a method wherein the polymer solution is poured into boiling water with stirring to remove the solvent by evaporation.

Thus, the hydrogenated block copolymer of the present invention obtained by hydrogenating at least 80% of the olefinic structure bonds of an unhydrogenated block copolymer comprising, as essential components, three polymer blocks, i.e. a polymer block A composed of 90% by weight or more of a vinyl aromatic compound, a polybutadiene polymer block having a 1,2-vinyl structure of 30-70% and a polybutadiene polymer block C having a 1,2-vinyl structure of less than 30%, is a thermoplastic elastomer having excellent weather resistance and heat resistance, can be used by adding thereto additives such as oil, filler, anti-oxidant and the like, or by mixing with other elastomer or a resin, and is very useful in industry.

EXAMPLES

The present invention is described more specifically below by way of Examples. However, the present invention is not restricted to the following Examples unless it is deviated from the gist.

Various test items were measured as follows.

Weight-average molecular weight (Mw) and number-average molecular weight (Mn)

Measured as follows in accordance with the description in "Gel Permeation Chromatography" (author: Takeuchi, publisher: Maruzen Co., Ltd.).

(1) A standard polystyrene of known molecular weight (monodisperse polystyrene manufactured by TOYO SODA MFG. CO., LTD.) is measured for molecular weight M and GPC (gel permeation chromatography) count, and then a calibration curve showing a correlation between M and EV (elution volume) is prepared. In that case, a concentration of 0.02% by weight is used.

The calibration curve using the standard polystyrene is corrected to a calibration curve by the Universal method.

(2) The GPC pattern of a sample is examined by the measurement method of GPC, and the molecular weight M of the sample is obtained using the calibration curve obtained in (1) above. In that case, sample preparation conditions and GPC measurement conditions are as follows.

Sample preparation (a) 0.08% by weight of 2,6-di-tert-butyl-p-cresol (an anti-oxidant) is dissolved in o-dichlorobenzene (a solvent).

(b) A sample is weighed into an Erlenmeyer flask so that the sample amount in solution becomes 0.1% by weight. Then, the o-dichlorobenzene solution prepared in (a) above is added so that the resulting total amount becomes 100% by weight.

(c) The Erlenmeyer flask is heated to 120° C. and stirred for about 60 minutes to make the flask contents a solution.

(d) The solution is subjected to GPC.

Incidentally, the solution is automatically filtered in the GPC apparatus by a sintered filter having a pore diameter of 0.5 μm. GPC measurement conditions (a) Apparatus: Model 150C manufactured by Waters Co. of U.S.
(b) Column: Model H manufactured by TOYO SODA MFG. CO., LTD.
(c) Sample amount: 500 μl
(d) Temperature: 135° C.
(e) Flow rate: 1 μm/min
(f) Total number of theoretical plates of column: $1 \times 10^4$ to $2 \times 10^4$ (measured with acetone)

Mw/Mn ratio was calculated from the results obtained above.

Styrene content

There was prepared a calibration curve on the absorption of phenyl group at 699 cm$^{-1}$ by the infrared analysis method. Then, using the calibration curve, the styrene content of a sample was obtained.

1,2-Vinyl bond content of polybutadiene

Measurement by the infrared analysis method, and calculation was made by the Morero method.

Melting point by DSC

There were used, as a differential scanning calorimeter (DSC), Differential Scanning Calorimeter Model 910 manufactured by du Pont and, as a recorder, Thermal Analyzer Model 990 manufactured by du Pont. The sample amount used was 10±0.1 mg. There was used, as a reference, 10.1 mg of α-alumina (a reference for DSC, manufactured by Shimazu Corp.). In the measurement, first a sample and the reference are fed into the DSC at room temperature; they are heated to +180° C.; then, they are cooled to −140° C. at a constant rate of 10° C./min; thereafter, analysis is made at a temperature elevation rate of 20° C./min Typical DSC patterns obtained thereby are shown in FIG. 1. The melting point (Tm) desired by the present invention is the maximum value of the endothermic peaks in FIG. 1.

Blocking tendency of hydrogenated copolymer

A hydrogenated polymer was pelletized by itself by a pelletizer. 200 g of the resulting pellets were subjected to a pressure of 34 g/cm$^2$ at 50° C. and were allowed to stand for one week under the pressure.

Then, adhesion among the pellets was examined to evaluate the blocking tendency of the hydrogenated polymer. No adhesion is preferable.

Preparation of polypropylene-containing composition

A polypropylene resin (Noblen BC-2 manufactured by Mitsubishi Petrochemical Co., Ltd.) and a hydrogenated block copolymer according to the present invention were kneaded by a 4-liter Banbury mixer (a 4-liter test Banbury of 30 HP manufactured by Godo Jukogyo K. K.) at a rotor rpm of 70 at a preheating temperature of 120° C. at a ram pressure of 4 kg/cm$^2$ for 5 minutes (kneading time).

The mixing ratio of the two components used was shown in Table 2.

After the kneading, the blend was pelletized by a pelletizer. The pellets were passed through a 6.5-ounce injection molding machine (6.5-ounce in-line screw type manufactured by Nihon Seiko K. K.) to prepare test pieces. The conditions of injection molding are shown below.

| | |
|---|---|
| Injection pressure: | Primary pressure = 500 kg/cm$^2$ |
| | Secondary pressure = 400 kg/cm$^2$ |
| Injection time: | 15 seconds at a primary pressure and a secondary pressure |
| Molding temperature: | 240° C. |
| Cooling temperature: | 40° C. |
| Cooling time: | 20 seconds |

Measurement methods for properties of polypropylene-containing resin composition

Izod impact strength (notched)

Measured in accordance with JIS K 7110.

Flexural modulus

Measured in accordance with JIS K 7203.

Surface gloss

Measured in accordance with JIS K 7105.

Hardness

Measured in accordance with JIS K 7202.

Adhesion strength of coating film

A hydrogenated block copolymer obtained according to the present invention was subjected to injection molding to obtain a sheet of 2 mm in thickness. The sheet was degreased with ethanol, then treated with trichloroethane vapor, and coated with a polyurethane type coating (coating: R 263, curing agent:R 230, both manufactured by Nihon B Chemical K. K.) so that the film thickness as dried became 90±10μ. The coated sheet was baked at 90° C. for 40 minutes, then allowed to stand for at least 48 hours, and measured for adhesion strength of coating film at a peeling angle of 90° at a pulling speed of 30 mm/min.

Example 1

(1) Into a 5-l autoclave were fed 2,500 g of dearated and dehydrated cyclohexane and 350 g of 1,3-butadiene. Thereto was added 0.50 g of n-butyllithium, and the mixture was polymerized. The polymerization was isothermal polymerization at 50° C. When the conversion became 31%, 12.5 g of tetrahydrofuran was added and temperature elevation polymerization from 50° C. to 80° C. was effected.

When the conversion reached about 100%, 150 g of styrene was added and polymerization was effected for 15 minutes. The molecular properties of the resulting A—B—C triblock copolymer were shown in Table 1.

(2) In a different vessel, 1.95 g of titanocene dichloride was dispersed in 30 ml of cyclohexane and reacted with 12.68 g of triethylaluminum.

The resulting dark blue solution which appeared uniform, was added to the polymer solution obtained in (1) above. The mixture was subjected to a hydrogenation reaction under a hydrogen pressure of 5.0 kgf/cm$^2$ at 50° C. for 2 hours.

The reaction mixture was subjected to solvent removal with methanol hydrochloric acid, then mixed with 2,6-di-tert-butylcatechol, and vacuum-dried. The molecular properties of the resulting A—B—C triblock copolymer were shown in Table 1; the DSC curve of the copolymer was shown in FIG. 1; the stress-strain curve of the molded sheet of the copolymer was shown in FIG. 2.

COMPARATIVE EXAMPLE 1

(1) Into an vessel similar to that used in Example 1 were fed 2,500 g of cyclohexane and 350 g of 1,3-butadiene. Thereto were added 12.5 g of tetrahydrofuran and 0.50 g of n-butyllithium. The mixture was subjected to temperature elevation polymerization from 50° C. to 80° C. When the conversion became about 100%, 150 g of styrene was added, and polymerization was effected for 15 minutes. The analysis of the resulting polymer is shown in Table 1.

(2) Then, the A-B block copolymer obtained in (1) above was subjected to hydrogenation in the same manner as in Example 1.

Figure 2:
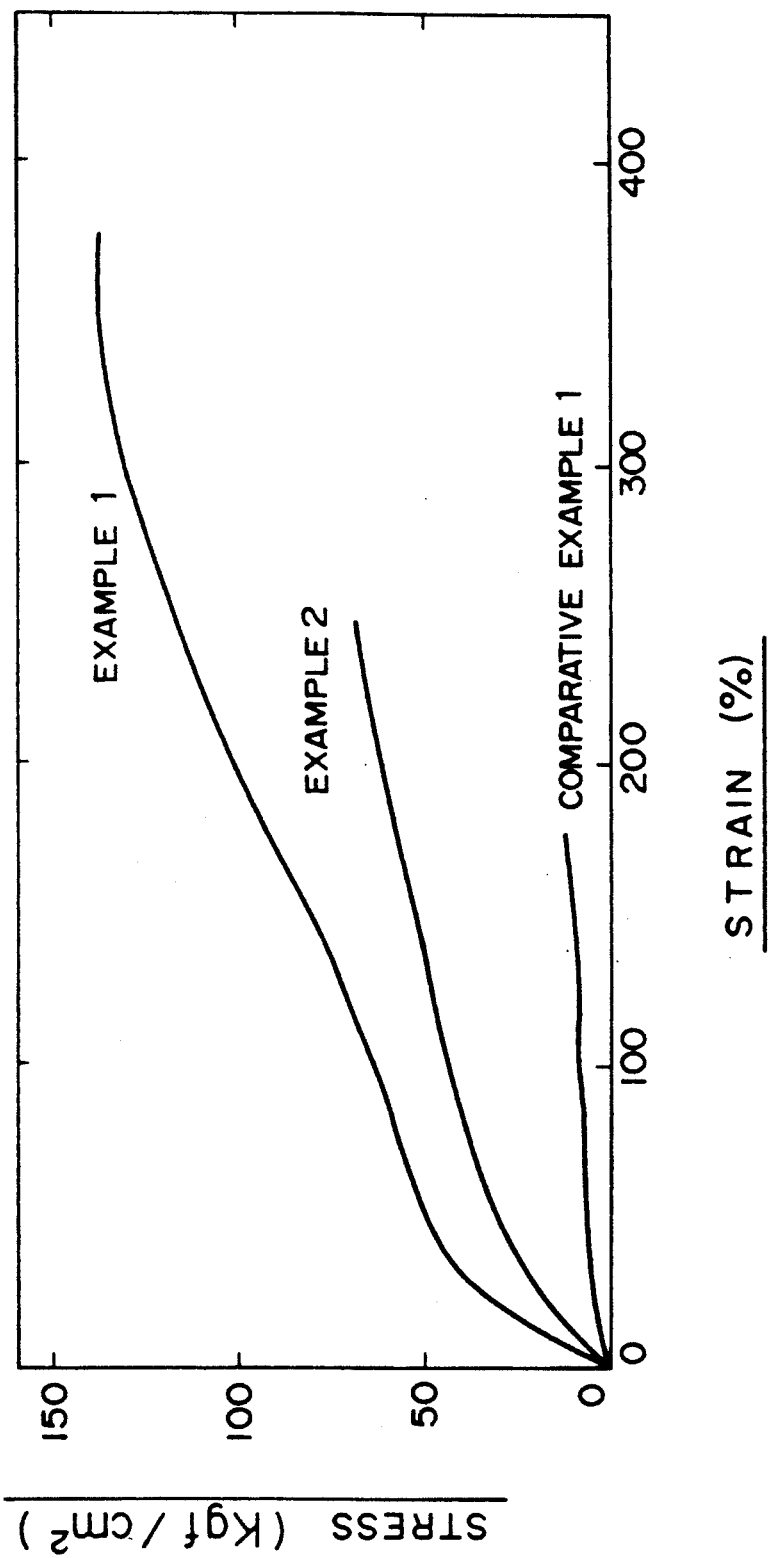
FIG. 2 shows the stress-strain curves of the sheets obtained by molding only the hydrogenated block copolymers obtained in Examples 1 and 2 and Comparative Example 1.

The molecular properties of the hydrogenated copolymer obtained were shown in Table 1; the DSC curve of the copolymer was shown in FIG. 1; and the stress-strain curve of the molded sheet of the copolymer was shown in FIG. 2. The copolymer of this Comparative Example has a low tensile strength and does not function as a thermoplastic elastomer. Further, the hydrogenated A—B block copolymer of this Comparative Example has a big drawback of being difficult to pelletize.

Example 2

(1) Into a vessel similar to that used in Example 1 were fed 2,500 g of cyclohexane, 350 g of 1,3-butadiene and 0.25 g of tetrahydrofuran. Thereto was added 0.50 g of n-butyllithium, and isothermal polymerization of 50° C. was effected.

When the conversion became 11%, 12.25 g of tetrahydrofuran was added, and temperature elevation polymerization from 50° C. to 80° C. was effected. When the conversion became about 100%, 150 g of styrene was added and polymerization was effected for 15 minutes. The molecular properties of the resulting A—B—C triblock copolymer were shown in Table 1.

(2) The A—B—C triblock copolymer obtained in (1) above was subjected to hydrogenation in the same manner as in Example 1.

The molecular properties of the resulting hydrogenated A—B—C triblock copolymer were shown in Table 1; the DSC curve of the copolymer was shown in FIG. 1; and the stress-strain curve of the molded sheet of the copolymer was shown in FIG. 2.

From the comparison of Examples 1 and 2 with Comparative Example 1, it is appreciated that the presence of a crystal having a melting point of 40°-110° C. as determined by DSC analysis has a large effect on tensile curve and that the hydrogenated A—B—C triblock copolymer of the present invention is superior. It is also appreciated that the triblock copolymer of the present invention has an excellent anti-blocking tendency.

Example 3

(1) A vessel similar to that of Example 1 was used, but the amount of n-butyllithium was increased and the amount of tetrahydrofuran was decreased from those of Example 1, whereby the A—B—C triblock copolymer shown in Table 1 was obtained.

(2) The copolymer obtained in (1) above was subjected to hydrogenation in the same manner as in Example 1. The molecular properties of the resulting hydrogenated A—B—C triblock copolymer were shown in Table 1.

Example 4

(1) A vessel similar to that of Example 1 was used, and an A—B—C triblock copolymer was synthesized in the same manner as in Example 1 except that the amount of n-butyllithium was increased.

To this A—B—C triblock copolymer was added dimethyldichlorosilane in an amount of 0.5 mole equivalent relative to the n-butyllithium. The mixture was subjected to a coupling reaction.

In the resulting block copolymer of (C—B—A)$_2$—X type, the C block had a vinyl structure of 13% and a number-average molecular weight of 11,000, the B block had a vinyl structure of 51% and a number-average molecular weight of 32,000, and the A block had a styrene content of 100% by weight and a number-average molecular weight of 18,000.

(2) The (C—B—A)$_2$—X type block copolymer obtained in (1) above was subjected to hydrogenation in the same manner as in Example 1. The hydrogenation degree of the butadiene unit was 96%, and the hydrogenation degree of the styrene unit was 1% or less.

Reference Example 1

(1) A vessel similar to that of Example 1 was used, and the amount of n-butyllithium was increased from that of Example 1 to 0.75 g. When the conversion reached 30%, 12.5 g of tetrahydrofuran was added and temperature elevation polymerization from 50° C. to 80° C. was effected. After confirming that the conversion reached about 100%, dimethyldichlorosilane was added in an amount of 0.5 mole equivalent (0.76 g) relative to the n-butyllithium, and a coupling reaction was effected. In the resulting block polymer of (C—B)$_2$—X type, the C block had a vinyl structure of 12% and a number-average molecular weight of 18,000, and the B block had a vinyl structure of 51% and a number-average molecular weight of 42,000.

The (C—B)$_2$—X type block polymer obtained in (1) above was subjected to hydrogenation under the same conditions as in Example 1. The hydrogenation degree of the butadiene unit was 97% and the hydrogenation degree of the styrene unit was 1% or less.

Examples 5-10 and Comparative Examples 2-10

In Examples 5 and 9, the hydrogenated A—B—C triblock copolymer obtained in Example 1 and a polypropylene (Noblen BC-2 manufactured by Mitsubishi Petrochemical Co., Ltd.) were kneaded at the proportions shown in Table 2, in accordance with the above-mentioned method to prepare pellets.

The pellets were then made into test pieces in accordance with the above-mentioned method.

As the elastomer, there were used, in Examples 6 and 10, the hydrogenated A—B—C triblock copolymer obtained in Example 2; in Examples 7 and 11, the hydrogenated A—B—C triblock copolymer obtained in Example 3; in Examples 8 and 12, the hydrogenated (C—B—A)$_2$—X type triblock copolymer obtained in Example 4; in Comparative Examples 3 and 7, an ethylene-propylene copolymer (JSR EP-02) manufactured by Japan Synthetic Rubber Co., Ltd.; in Comparative Examples 4 and 8, the hydrogenated block copolymer of (C—B)$_n$—X type obtained in Reference Example 1; in Comparative Examples 5 and 9, a hydrogenated styrene-butadiene-styrene triblock copolymer (A—B—A triblock copolymer) manufactured by Shell Chemical Co.; and in Comparative Examples 6 and 10, the hydrogenated A—B block copolymer obtained in Comparative Example 1. These elastomers were kneaded with the polypropylene at the proportions shown in Table 2, in the same manner as in Examples 5 and 9 to prepare test pieces. The properties of the resulting compositions are shown in Table 2. The properties of the polypropylene alone are shown as Comparative Example 2.

As is clear from the results of Table 2, the hydrogenated (C—B)$_2$—X type block copolymer containing no polystyrene block has a drawback of low peeling strength of coating film.

The hydrogenated A—B—A triblock copolymer has drawbacks of low Izod impact and extremely low gloss.

In contrast, the A—B—C type triblock copolymers according to the present invention have solved the drawbacks of the above copolymers and are pelletizable. Their resin compositions with polypropylene are well balanced in Izod impact, gloss, peeling strength of coating film and flow property.

TABLE 1

|  | Example 1 | Comparative Example 1 | Example 2 | Example 3 | Example 4 | Reference Example 1 |
|---|---|---|---|---|---|---|
| Unhydrogenated polymer | | | | | | |
| <A block> (wt. %) | 27.7 | 27.7 | 29.9 | 30.7 | 29.5 | 0 |
| Number-average molecular weight ($\times 10^{-4}$) | 4.3 | 3.8 | 4.0 | 3.1 | 1.8 | — |
| Styrene content (wt. %) | 100 | 100 | 100 | 100 | 100 | — |
| <B block> (wt. %) | 50.3 | 72.3 | 61.9 | 51.5 | 52.5 | 70.0 |
| Number-average molecular weight ($\times 10^{-4}$) | 7.8 | 9.9 | 8.3 | 5.2 | 3.2 | 4.2 |
| 1,2-Vinyl structure (%) | 53 | 52 | 52 | 39 | 51 | 51 |
| <C block> (wt. %) | 22.0 | 0 | 8.2 | 17.8 | 18.0 | 30.0 |
| Number-average molecular weight ($\times 10^{-4}$) | 3.4 | — | 1.1 | 1.8 | 1.1 | 1.8 |
| 1,2-Vinyl structure (%) | 12 | — | 15 | 12 | 13 | 12 |
| Number-average molecular weight of block copolymer ($\times 10^{-4}$) | 15.5 | 13.7 | 13.4 | 10.1 | 10.7 | 11.2 |
| Weight-average molecular weight/number-average molecular weight | 1.1 | 1.1 | 1.2 | 1.1 | 1.4 | 1.2 |
| Hydrogenated polymer | | | | | | |
| Hydrogenation degree | | | | | | |
| Hydrogenation degree of butadiene unit (%) | 96 | 97 | 97 | 99 | 96 | 97 |
| Hydrogenation degree of styrene unit (%) | 1 or below | 1 or below | 1 or below | 1 or below | 1 or below | 1 or below |
| DSC analysis | | | | | | |
| Melting point of crystal of 40–120° C. (°C.) | 100 | Not present | 88 | 101 | 102 | 101 |
| Heat of fusion of crystal of 40–120° C. (cal/g) | 5.3 | — | 1.5 | 2.6 | 5.5 | 6.9 |
| Glass transition temperature (°C.) | −58 | −57 | −58 | −53 | −56 | −57 |
| Properties of molded sheet | | | | | | |
| Tensile strength (kgf/cm²) | 136 | 10 | 66 | 115 | 153 | — |
| Elongation at break (%) | 360 | 160 | 240 | 380 | 450 | — |
| Blocking of pellets | None | None | None | None | None | None |

TABLE 2

|  | Example 5 | Example 6 | Example 7 | Example 8 | Comparative Example 2 | Comparative Example 3 | Comparative Example 4 | Comparative Example 5 | Comparative Example 6 |
|---|---|---|---|---|---|---|---|---|---|
| Mixing Proportion | | | | | | | | | |
| Polypropylene (wt. %) | 80 | 80 | 80 | 80 | 100 | 80 | 80 | 80 | 80 |
| Elastomer component (wt. %) | 20 | 20 | 20 | 20 | | 20 | 20 | 20 | 20 |
| Type of elastomer component | Example 1 | Example 2 | Example 3 | Example 4 | Not used | EP-02*1 | Reference Example 1 | KRATON-G*2 | Comparative Example 1 |
| MFR (230° C.; g/10 min) | 6.5 | 7.8 | 12.4 | 7.4 | 15.8 | 9.5 | 7.5 | 7.1 | 8.5 |
| Izod impact strength | | | | | | | | | |
| −20° C. (kg · cm/cm) | 15 | 18 | 19 | 16 | 6 | 13 | 13 | 8 | 22 |
| −40° C. (kg · cm/cm) | 11 | 12 | 13 | 12 | 4 | 8 | 9 | 6 | 13 |
| Flexural modulus (kgf/cm²) | 6220 | 6000 | 5900 | 6100 | 9020 | 6200 | 5900 | 6200 | 5540 |
| Gloss (%) Incident angle = 60° | 46 | 57 | 50 | 56 | 58 | 51 | 60 | 32 | 61 |
| Hardness (shore D) | 67 | 66 | 67 | 66 | 71 | 63 | 61 | 66 | 63 |
| Peeling strength of coating film (g/cm) | 1400 or above | 1400 or above | 1400 or above | 1400 or above | 200 | 800 | 600 | 1100 | 1050 |

|  | Example 9 | Example 10 | Example 11 | Example 12 | Comparative Example 7 | Comparative Example 8 | Comparative Example 9 | Comparative Example 10 |
|---|---|---|---|---|---|---|---|---|
| Mixing Proportion | | | | | | | | |
| Polypropylene (wt. %) | 60 | 60 | 60 | 60 | 60 | 60 | 60 | 60 |
| Elastomer component (wt. %) | 40 | 40 | 40 | 40 | 40 | 40 | 40 | 40 |
| Type of elastomer component | Example 1 | Example 2 | Example 3 | Example 4 | EP-02*1 | Reference Example 1 | KRATON-G*2 | Comparative Example 1 |
| MFR (230° C.; g/10 min) | 3.1 | 5.2 | 6.1 | 4.2 | 5.1 | 5.2 | 2.0 | 3.8 |
| Izod impact strength | | | | | | | | |
| −20° C. (kg · cm/cm) | NB*3 | NB | NB | NB | NB | NB | NB | NB |
| −40° C. (kg · cm/cm) | NB | NB | NB | NB | NB | NB | 18 | NB |
| Flexural modulus (kgf/cm²) | 3770 | 3380 | 3600 | 3650 | 4170 | 3700 | 4040 | 2900 |
| Gloss (%) Incident angle = 60° | 40 | 58 | 50 | 52 | 64 | 73 | 20 | 63 |
| Hardness (shore D) | 62 | 58 | 61 | 62 | 52 | 56 | 60 | 52 |
| Peeling strength of coating film (g/cm) | 1400 or above | 1400 or above | 1400 or above | 1400 or above | 600 | 400 | 1200 | 1100 |

*1 Ethylene-propylene copolymer manufactured by Japan Synthetic Rubber Co., Ltd.
*2 Hydrogenated styrene-butadiene-styrene triblock copolymer manufactured by Shell Chemical Co.
*3 NB stands for None Break.

APPLICABILITY IN INDUSTRY

The hydrogenated block copolymer of the present invention can function as a pelletizable thermoplastic elastomer because it has a specific crystalline portion. When used, for example, as an impact resistance improver for polypropylene, etc., the block copolymer of the present invention can provide a polypropylene resin composition, etc. well balanced in Izod impact, gloss, peeling strength of coating film and flow property, as compared with hydrogenated A—B—A type or C—B—C type.

Further, the hydrogenated block copolymer of the present invention or a soft composition comprising the copolymer can optionally be made so as to be cross-linked or non-crosslinked, or to have a foaming property or a non-foaming property; can be subjected to any of extrusion molding, film molding, blow molding, vacuum molding and press molding; can be used in wide applications such as rubber products (e.g. tire, vibration-damping rubber, roofing, sponge), parts for daily use, parts for acoustic appliances, articles used in industry (e.g. belt, packing, cushion material, sealant), parts for transportation vehicles, boots, interior and exterior parts for automobiles (e.g. mogol, hose, sealing material, bumper, weather strip), electric wire, footwear material, buffer material, package materials (e.g. film, sheet) and the like; thus, have very high applicability in industry.

The hydrogenated block copolymer of the present invention, when added to a resin, gives a resin composition having excellent impact resistance, heat resistance and moldability, as compared with ordinary thermoplastic resins. Therefore, the resin composition is useful particularly in applications such as parts for electric communication (e.g. LED lamp, relay case, switch, connector, coil bobbin, resistor, computer parts, telephone exchange parts, condenser case, tuner, terminal stand, timer case), parts for household electric appliances (e.g. hair drier, iron, shaver, egg boiler, coffee maker, VTR parts, electronic oven parts, TV parts, acoustic appliance parts, compact disc, refrigerator parts, air conditioner parts, word processor, light cover), parts for precision machines (e.g. camera parts, watch or clock parts, strobe parts, binocular, microscope parts, projector parts), machine parts (e.g. electromotive tool, vender parts, hand labeler, elevator parts, escalator parts, motor case, oil filter case, pump parts, bolt, nut, gear, cam, fiber bobbin, counter frame, office computer parts, register parts, portable calculator parts, typewriter parts, drawing instrument parts, facsimile parts, copier parts), automobile and vehicle parts (e.g. car heater fan, bumper, instrument panel, meter panel, windshield of autobicle, head lamp, tail lamp, spoiler, part for rail insulation, armrest for vehicle, curtain cover, wiper cover, mold grip, meter needle, wheel cover), parts for leisure articles (e.g. surf rider, golf goods), housing, cover, surface treating agent, coating and the like.

What is claimed is:

1. A hydrogenated block copolymer comprising a copolymer having a number-average molecular weight of 40,000-700,000, obtained by hydrogenating at least 80% of the olefinic bonds of a block copolymer having in the molecule at least one each of
    a polymer block A composed of 90% by weight or more of a vinyl aromatic compound,
    a polybutadiene polymer block B having a 1,2-vinyl structure of 30-70%, and
    a polybutadiene polymer block D having a 1,2-vinyl structure of less than 30%,
in which block copolymer the content of the polymer block A is 10-50% by weight, the content of the polymer block B is 30-80% by weight, and the content of the polymer block C is 5-30% by weight, wherein the block copolymer is represented by the formula A—B—C or (C—B—A)$_n$X where n is 2, and X is a coupling agent residue.

2. A modified hydrogenated block copolymer obtained by modifying a hydrogenated block copolymer according to claim 1 with an anhydride of an $\alpha,\beta$-unsaturated carboxylic acid.

3. A thermoplastic resin composition comprising 100 parts of a polyamide, a polyester, a polyphenylene oxide, a polyacetal, a polycarbonate, a polymethacrylate, a polyphenylene sulfide or an acrylonitrilestyrene copolymer and 5-40 parts by weight of a modified hydrogenated block copolymer according to claim 2.

4. A thermoplastic resin composition comprising 100 parts by weight of a thermoplastic resin and 5-50 parts by weight of a hydrogenated block copolymer according to claim 1.

5. A composition according to claim 4, wherein the thermoplastic resin is a polyolefin or a polystyrene.

6. A hydrogenated block copolymer according to claim 1, wherein said polybutadiene polymer block C has a 1,2-vinyl structure content of from 3-20%.

* * * * *